F. SCHIMMEL.
LINOTYPE MACHINE.
APPLICATION FILED AUG. 24, 1905.
953,237.
Patented Mar. 29, 1910.
12 SHEETS—SHEET 4.
Fig. 7.
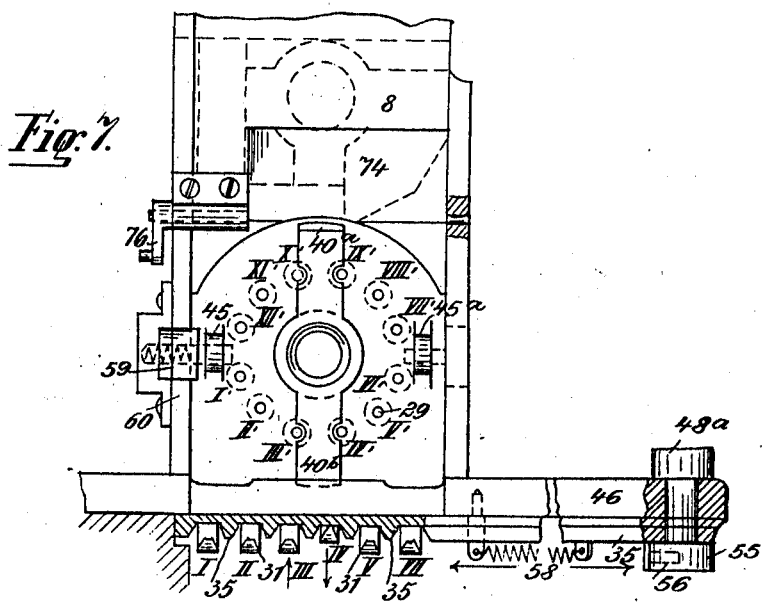
Fig. 3.        Fig. 8.
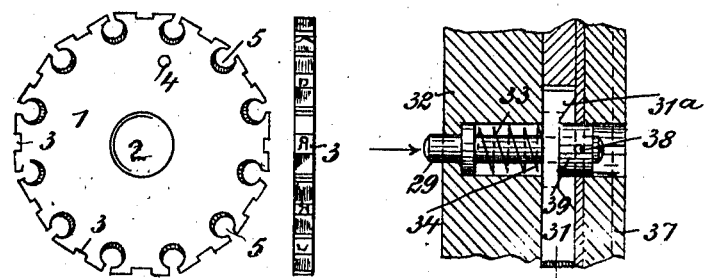
Fig. 7ª.        Fig. 8ª.
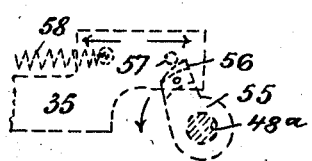   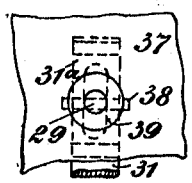
Witnesses        Inventor
       Franz Schimmel
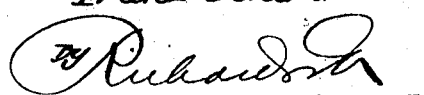
       Attorneys

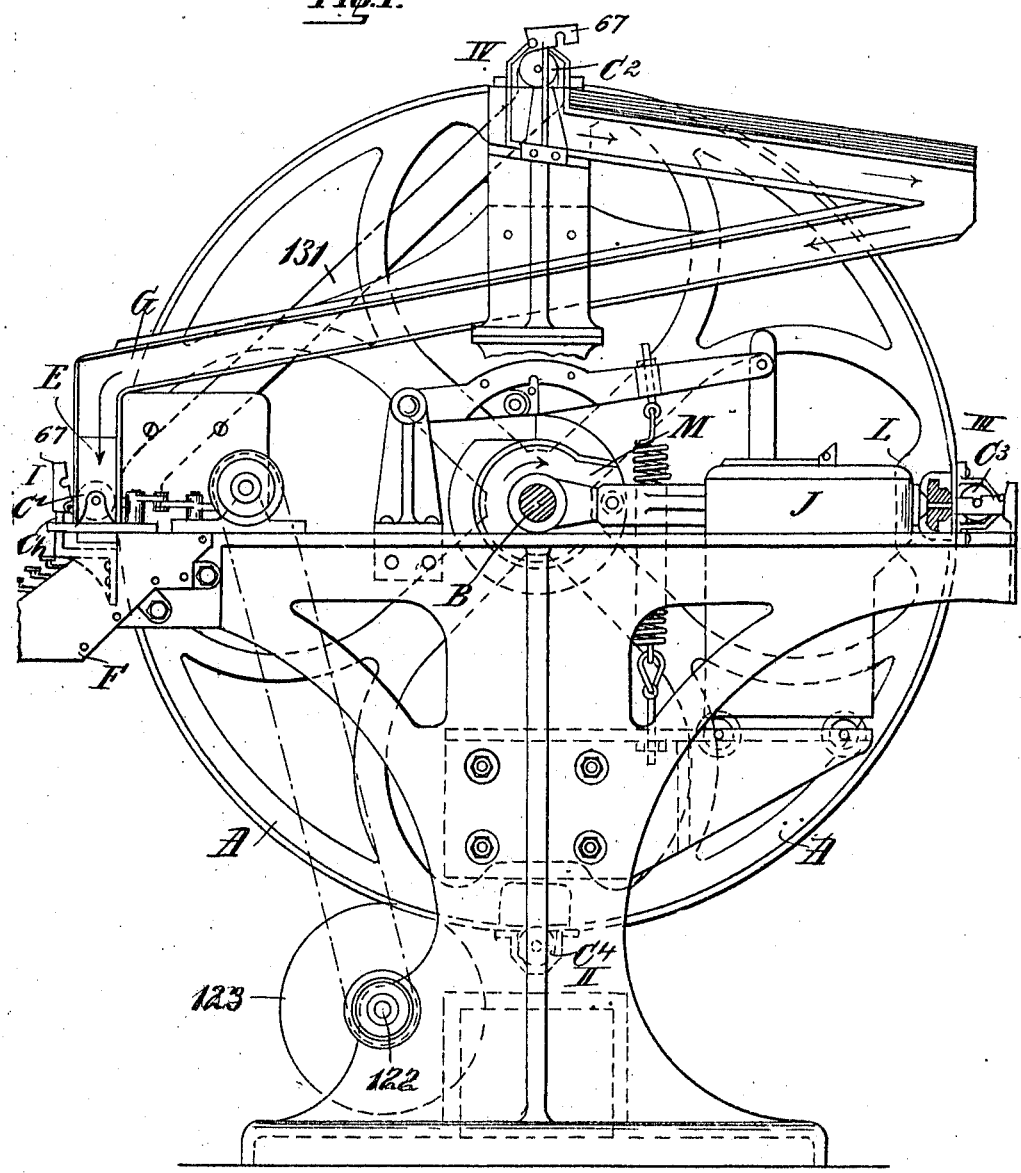

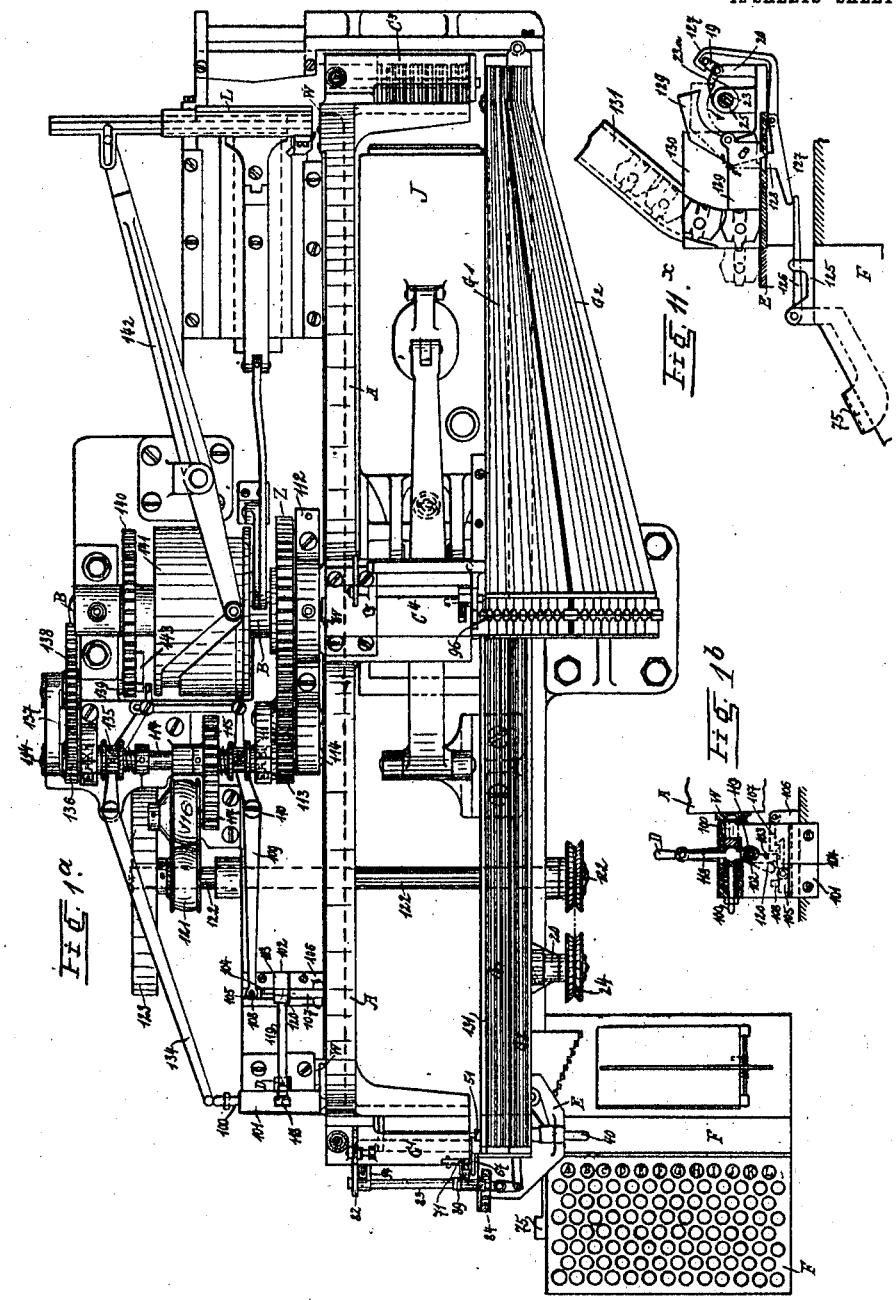

F. SCHIMMEL.
LINOTYPE MACHINE.
APPLICATION FILED AUG. 24, 1905.

953,237.

Patented Mar. 29, 1910.
12 SHEETS—SHEET 5.

Witnesses
Inventor
Franz Schimmel

F. SCHIMMEL.
LINOTYPE MACHINE.
APPLICATION FILED AUG. 24, 1905.

953,237.

Patented Mar. 29, 1910.
12 SHEETS—SHEET 6.

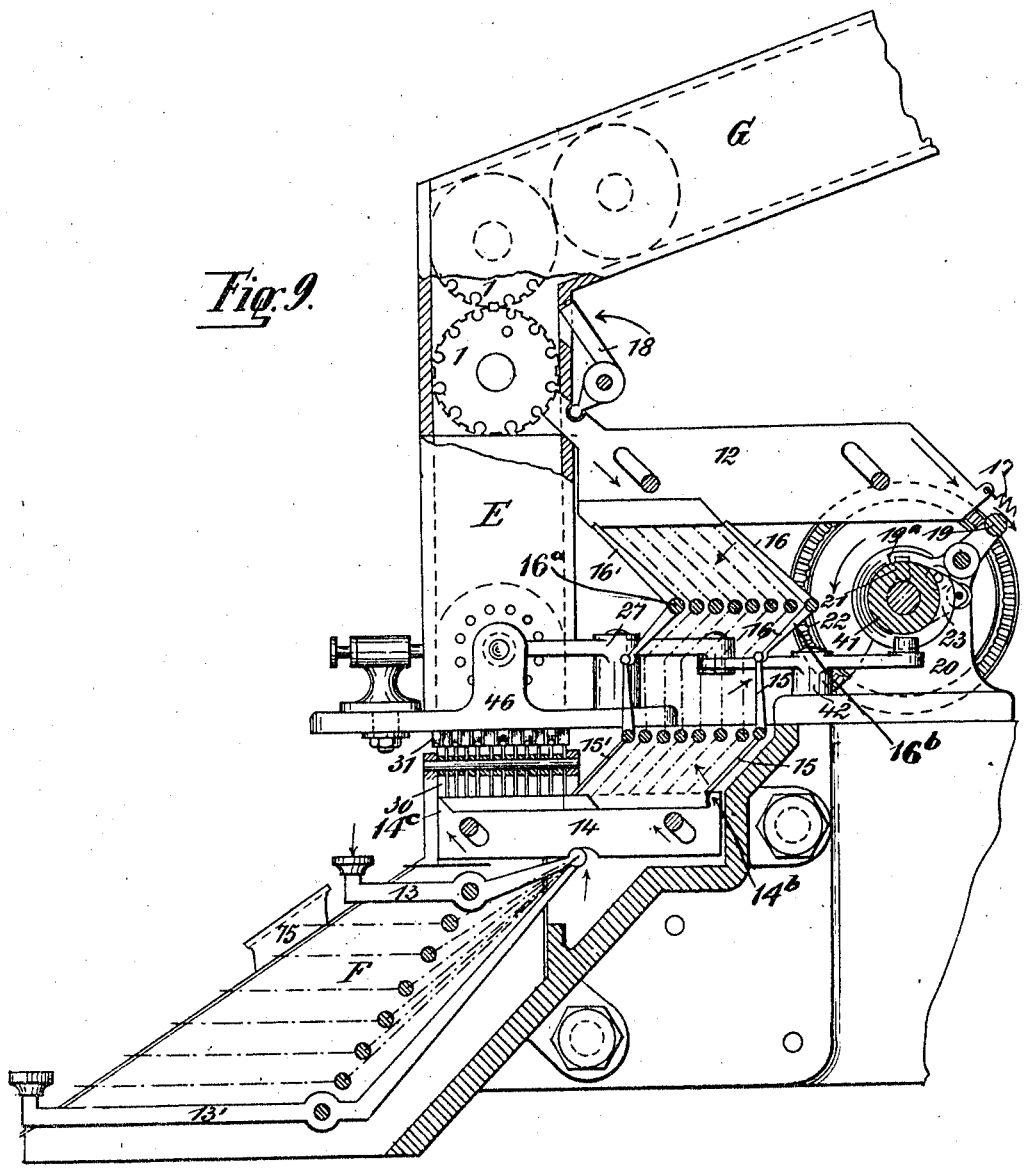

F. SCHIMMEL.
LINOTYPE MACHINE.
APPLICATION FILED AUG. 24, 1905.
953,237.
Patented Mar. 29, 1910.
12 SHEETS—SHEET 8.
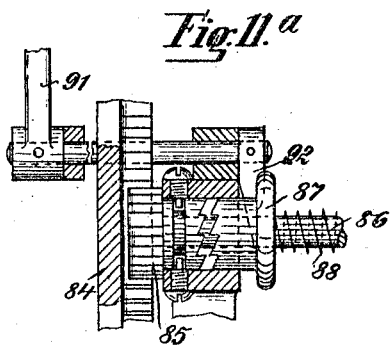
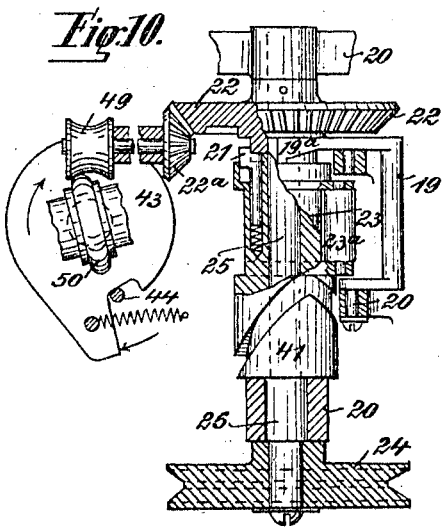
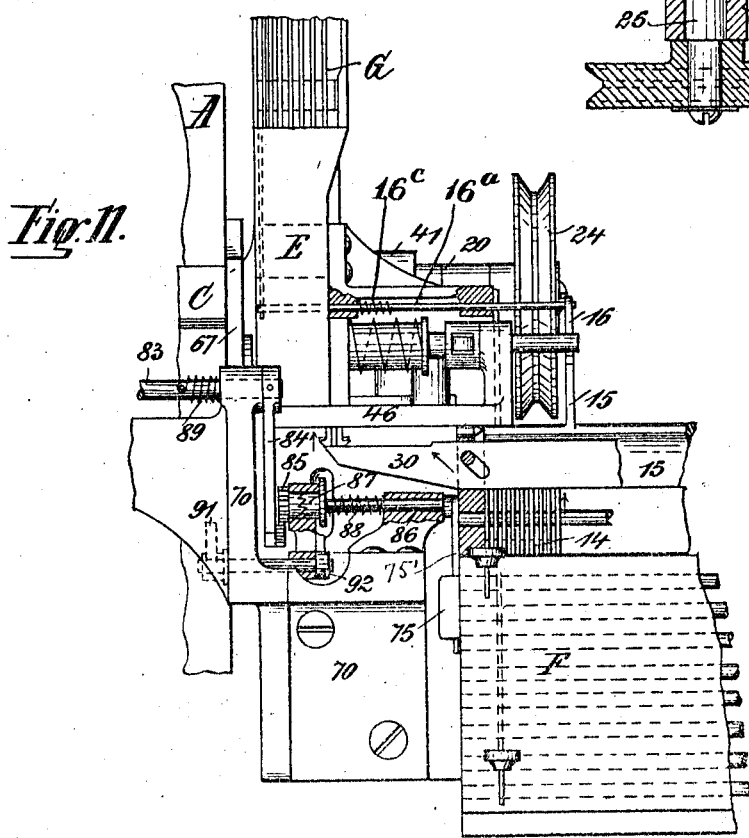
Witnesses
H. M. Kuehne
John A. Percival
Inventor
Franz Schimmel
By Richards
Attorneys

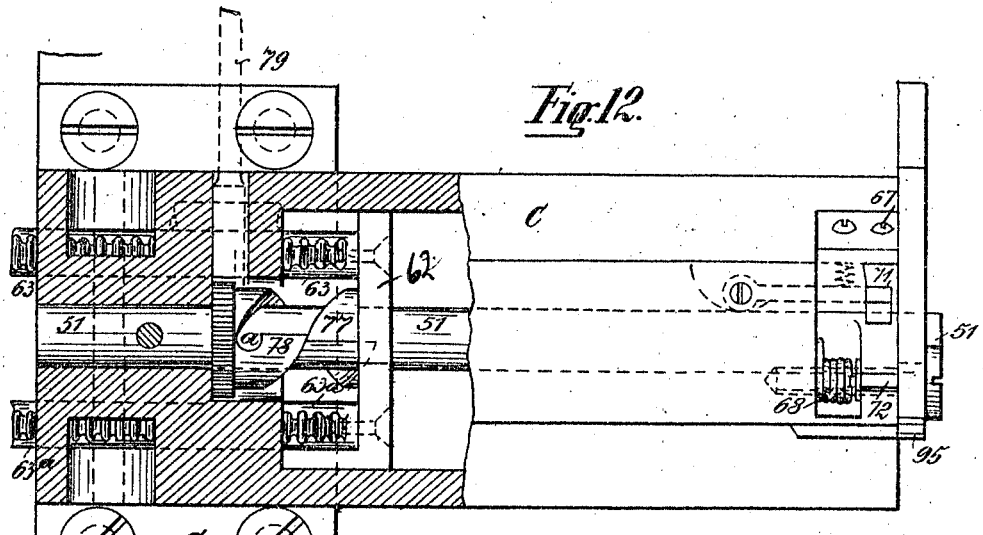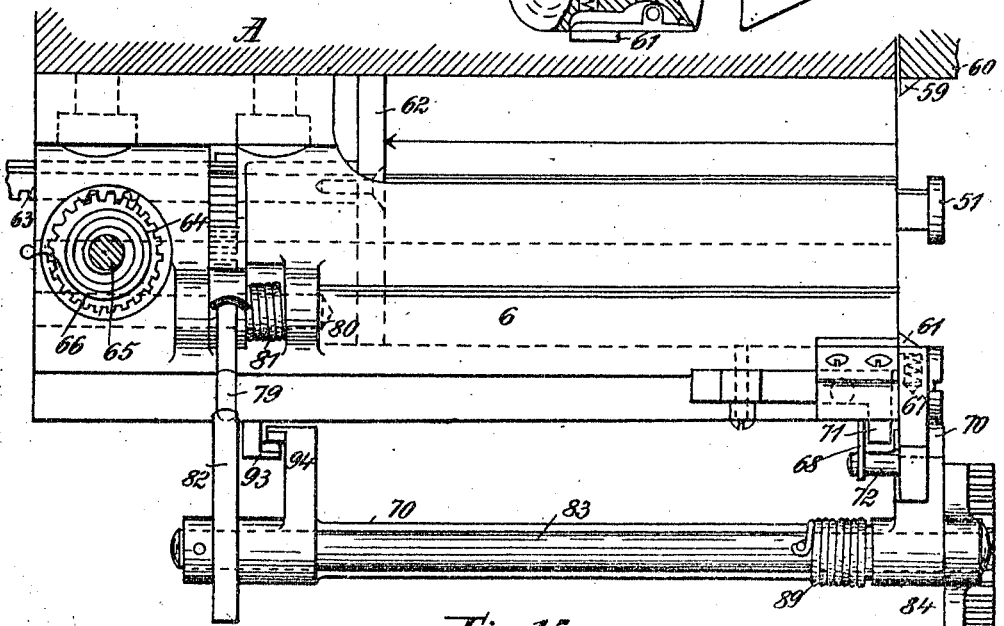

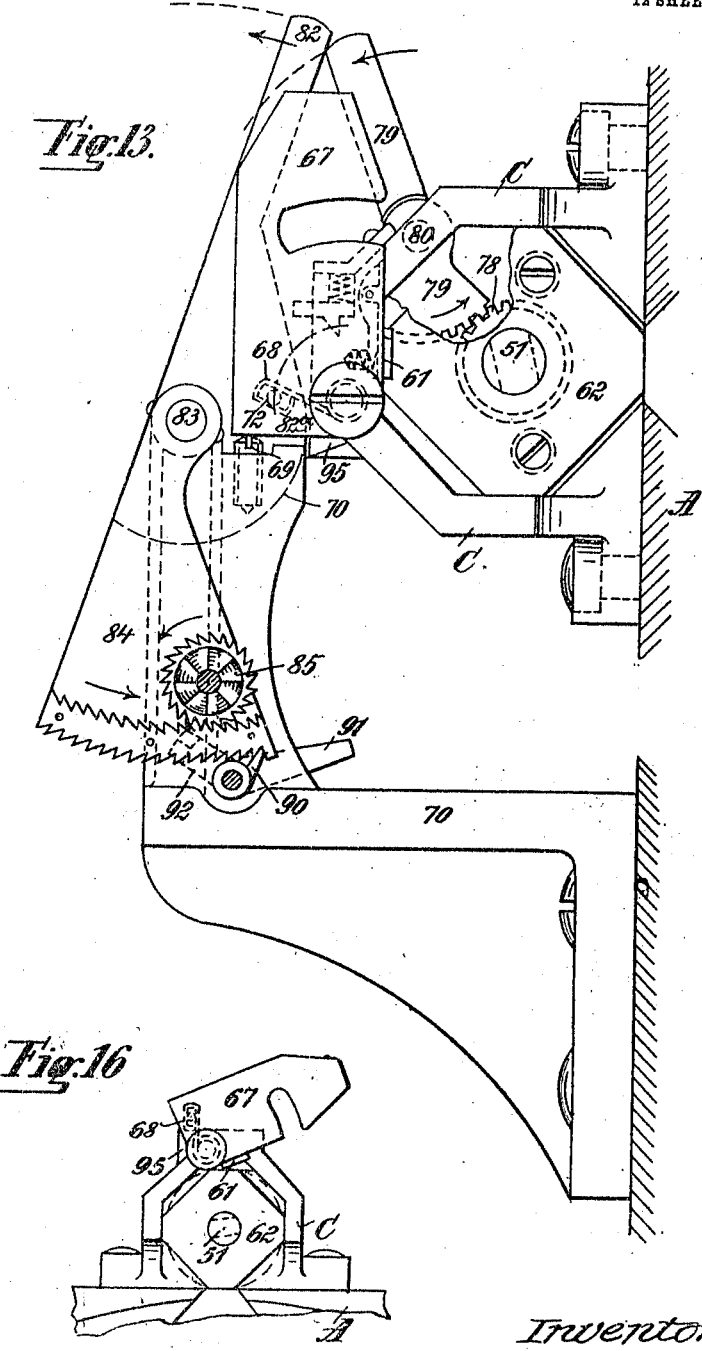

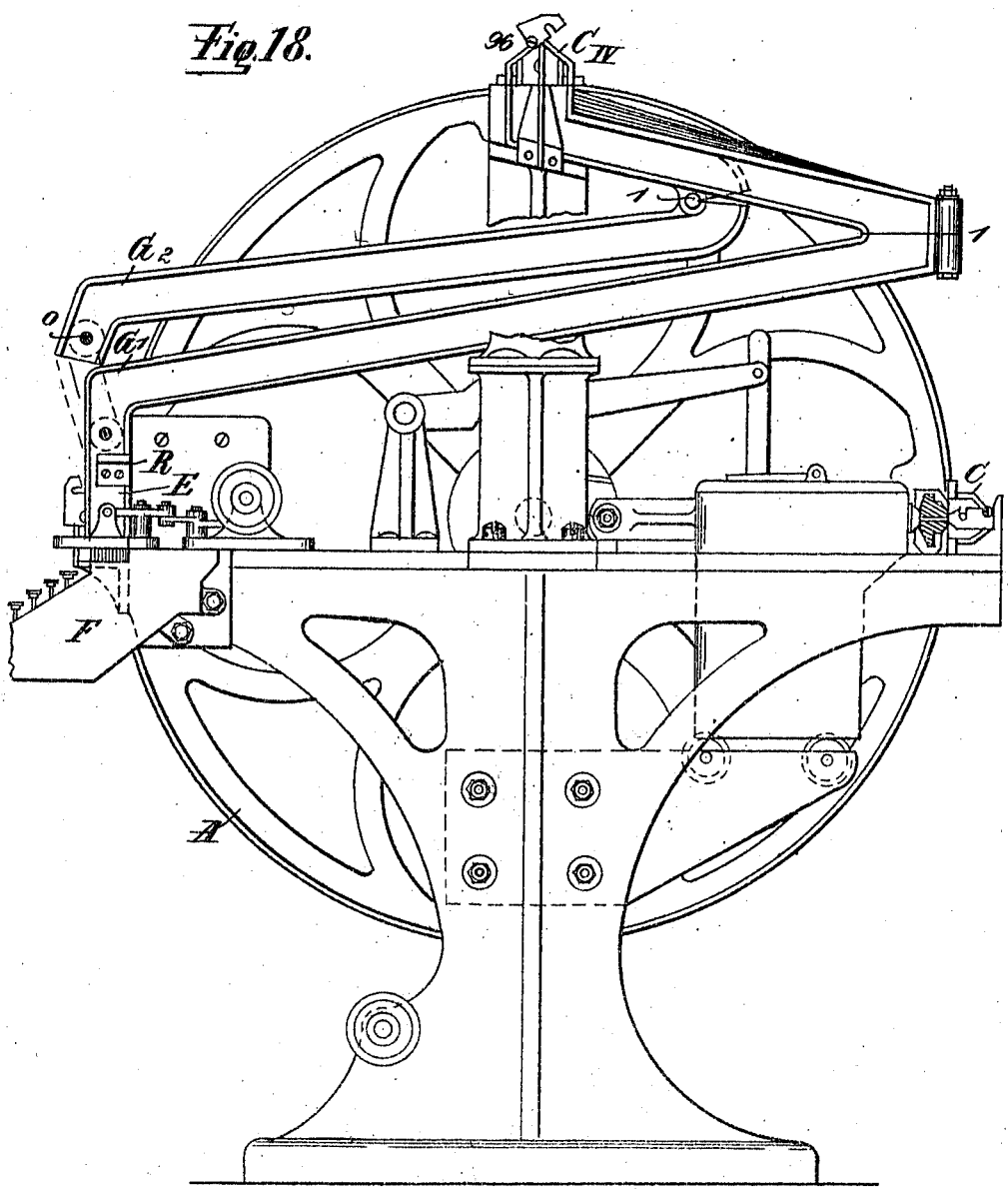

F. SCHIMMEL.
LINOTYPE MACHINE.
APPLICATION FILED AUG. 24, 1905.
953,237.
Patented Mar. 29, 1910.
12 SHEETS—SHEET 12.
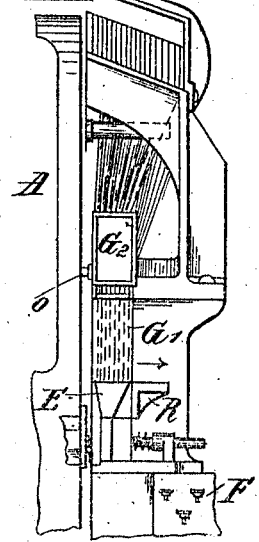
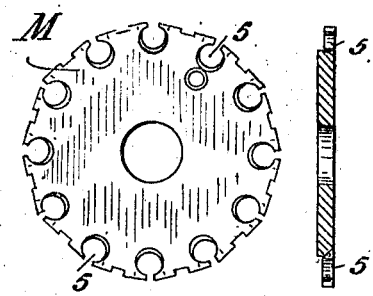
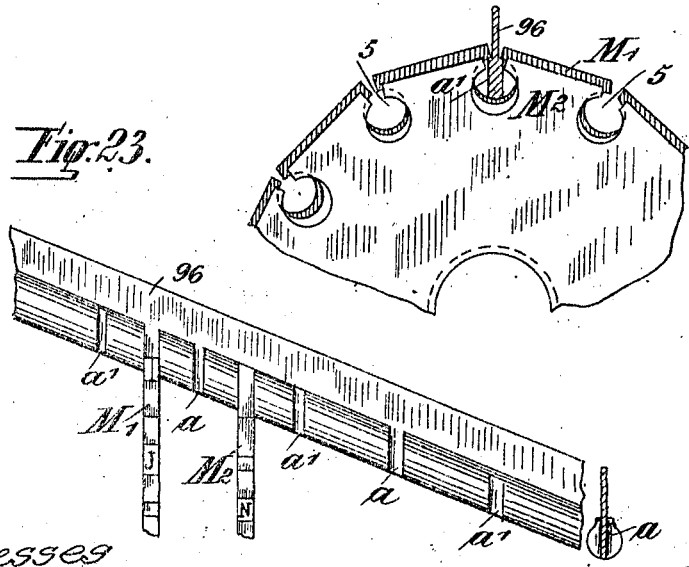
Witnesses
N. M. Kuehne
John A. Percival
Inventor
Franz Schimmel
By Richardson
Attorneys

UNITED STATES PATENT OFFICE.

FRANZ SCHIMMEL, OF BERLIN, GERMANY.

LINOTYPE-MACHINE.

953,237.   Specification of Letters Patent.   Patented Mar. 29, 1910.

Application filed August 24, 1905. Serial No. 275,693.

*To all whom it may concern:*

Be it known that I, FRANZ SCHIMMEL, a subject of the Emperor of Austria-Hungary, and resident of Berlin, in the Kingdom of Prussia, Germany, have invented certain new and useful Improvements in Linotype-Machines, of which the following is a specification.

The present invention relates to a matrix-setting machine, in which the matrices are taken from the collecting magazines by means of striking keys and are then brought before a casting apparatus, where casts are taken from them, and thereupon automatically returned into their collecting magazines.

The fundamental difference which distinguishes this machine from those hitherto in use is that in the former the setting, casting and distributing is effected in various places located on the circumference of a circle toward which places the matrix line is successively fed by means of an intermittently rotating conveyer. This arrangement allows the matrices, in a simple manner, to be lowered, to be fed toward the casting apparatus and to be raised again so that no construction that may be surveyed only with difficulty is required for the new machine in order to prescribe to the matrices the course over which they must pass for being set, cast and again returned into the collecting magazine.

The annexed drawings represent a form of execution of the new machine embodying the idea of this invention.

Figure 2:
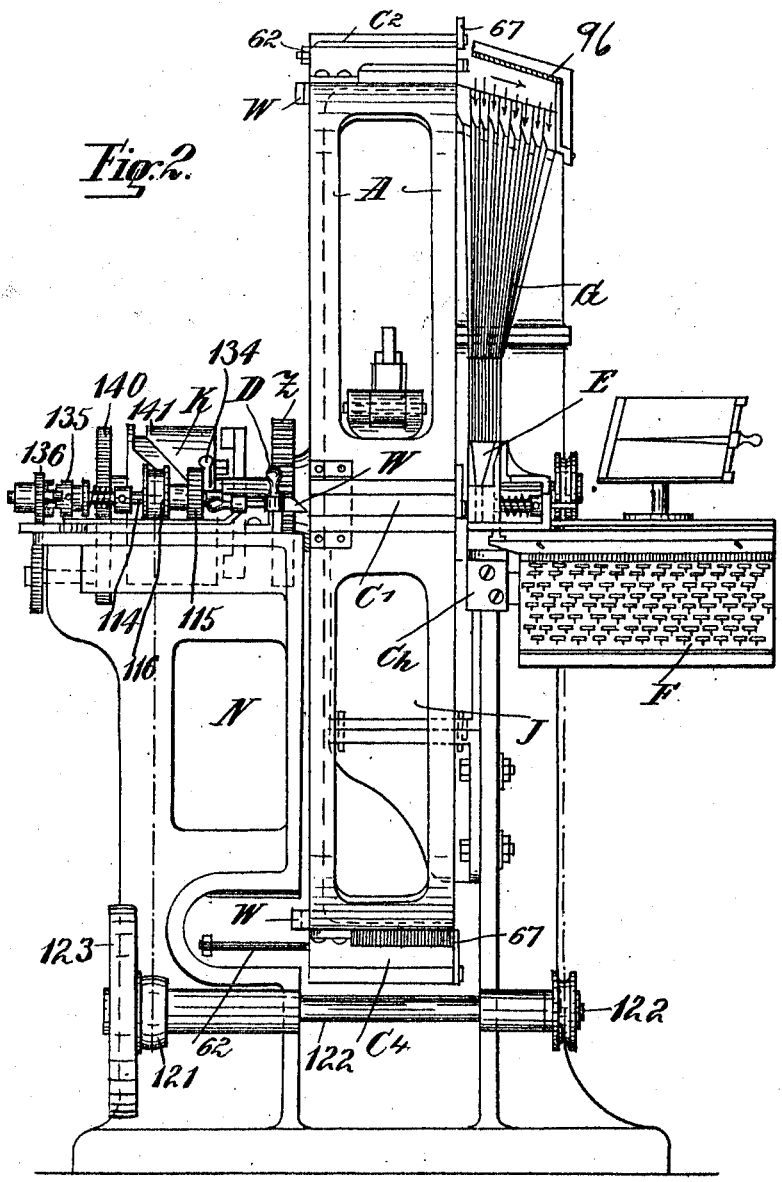
Figure 6:
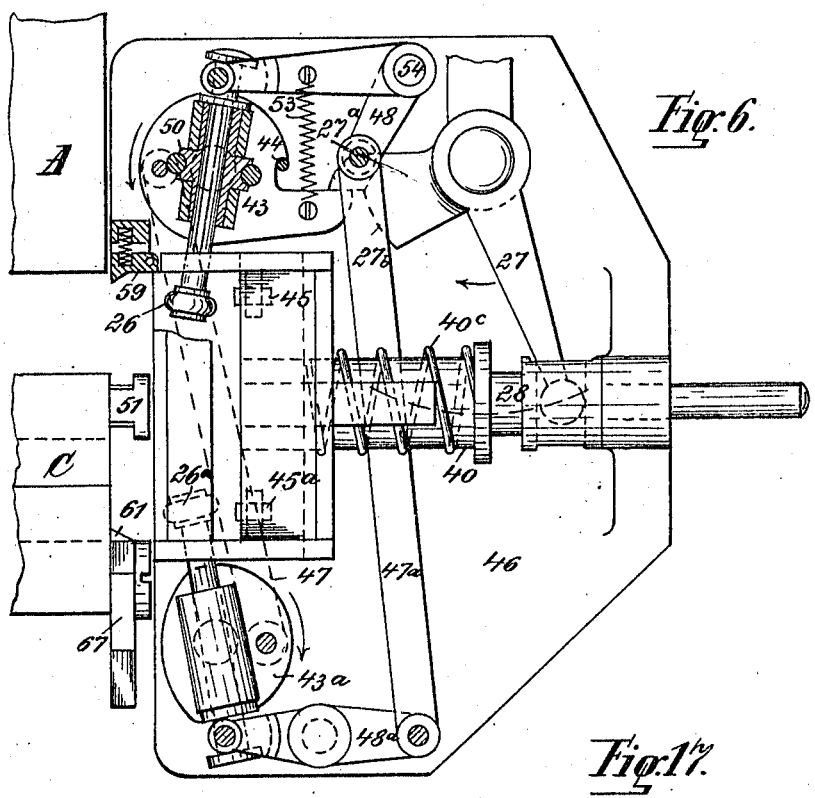
Figure 4:
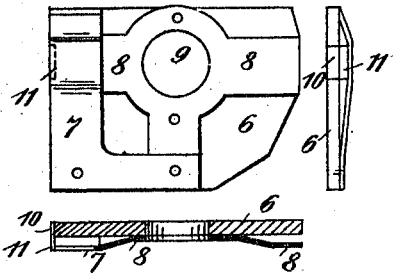
Figure 17:
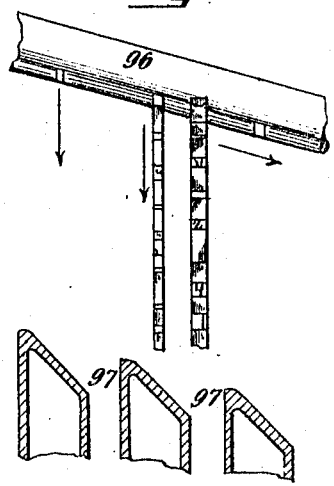
Figure 5:
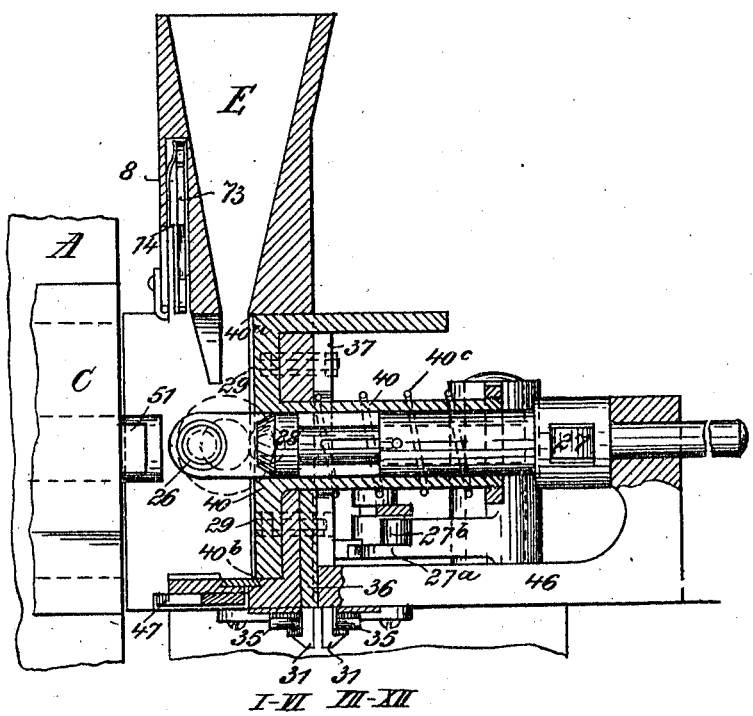

Figure 1 is a side view; Fig. 1ª is a plan view of the whole apparatus; Fig. 1ᵇ is a detail view showing the clutch means for the wheel A and its driving means; Fig. 2 is a front view; Fig. 3 shows the type matrix in front and side view; Fig. 4 shows the space belonging thereto, in three views; Fig. 5 shows a section through the matrix collector; Fig. 6 is a plan view of the collector; Fig. 7 is a lateral view of the front and rear plate of the matrix collector; Fig. 7ª shows the arrangement of the device for drawing back the releasing slides; Fig. 8 shows the arrangement of the arresting stud, in section; Fig. 8ª shows the arrangement of the arresting stud, side view; Fig. 9 shows the arrangement of the key board and of the device for releasing the matrices from the matrix case; Fig. 10 shows the driving and coupling mechanism for the releasing and feeding device; Fig. 11 is a front view to Fig. 9 with the arrangement of the space-key lever; Fig. 11ª shows the coupling between the space-key lever and the toothed segment; Fig. 11ˣ is a detail view; Fig. 12 is a front view and partial section through the matrix-line holder; Fig. 13 is a side view of the same and arrangement of the levers connected therewith, in position I; Fig. 14 shows the line-closing piece in closed position; Fig. 15 is a plan view to Figs. 12 and 13; Fig. 16 shows the matrix-line holder in the distributing position where the line-closing piece is entirely open and allows the egress of the matrices; Fig. 17 is a sketch illustrating the distribution of the matrices; Fig. 18 is a lateral view of the rotary machine constructed for mixed composition; Fig. 19 is a front view of one part of said machine, while Figs. 20—23 represent details of the construction.

The wheel A revolving around shaft B forms the lifting cog for the matrices and bears, for this purpose, box shaped casings screwed to its circumference which forms the matrix line holders $C^1$, $C^2$, $C^3$, $C^4$, in which the matrices are inserted in lines, as is explained later. The revolution of the conveying wheel is obtained through a perpetually running gear K and is a periodic rotation so that the matrix line holders fastened to the conveying wheel come consecutively to a standstill at the setting place at which the matrices are being inserted in lines. With four matrix line holders in a quarter revolution of the wheel A, the matrix line holder $C^1$ reaches, therefore, the place which was formerly occupied by the line holder $C^2$ while the latter has taken the place of line holder $C^3$, etc. This periodic rotation of the conveying wheel A is thereby made possible by the perpetually running gear K (Fig. 2) which is provided with an automatically acting disengaging gear. For example, the gear K is, by means of an engaging and disengaging coupling, connected with tooth wheel Z (Fig. 2) fastened to the conveying wheel A, and this coupling may also be disengaged through the lever D which stands under spring pressure and bears a conic pivot trailing on the conveying wheel A. If now on the side of each of the matrix line holders $C^1$—$C^4$ a cavity, cleft or the like is arranged in such a manner on the conveying wheel that the pivot trailing on the conveying wheel is pushed back by the conveying wheel and the coupling thereby engaged, then the conveying wheel is put into rotation by the gear K and rotates until the conic pivot trailing on the conveying wheel A jumps into one of the cavities of the wheel A. Since the lever D is connected with this pivot, the coupling becomes disengaged and the gear K runs on without effect while the conveying wheel is held fast by the conic pivot. The mechanism for carrying out this operation is as follows:—Laterally, on the conveying-wheel A, side by side with the matrix line holders C, four arresting plates W (Fig. 1ᵃ) are arranged which are provided with a slanting plane and with a conic hole. At every quarter revolution of the conveying-wheel, the slanting plane causes the compression of the stop-pin 100 which then adjusts itself in the arresting-plate W, thereby holding fast the conveying-wheel A. By compressing the stop-pin 100, the lever 118 (which is fastened to the standard 101 upon the axis 102) is pressed back, whereby the axis 102, also, is set into partial rotation which rotation is transmitted to the lever 103, the latter being likewise fastened upon the axis 102. The lever 103 is thereby connected with the latch 104 which is fastened in the casing 105. The casing 105 is in this way displaced toward the right. This casing 105 is, thus, displaceably arranged in the bearing 106 and is held fast by a pawl 107 fastened at the right end of the bearing 106 (Fig. 1ᵇ). The casing 105 is provided with a pivot 108 which is linked with the fork-shaped end of the double-arm coupling-lever 109 (Fig. 1ᵃ). The coupling-lever 109 is fastened in a rotatory position upon the pivot 110 and is provided on its second arm with a roll which runs in the tooth gear 111, so that through the above named compression of the stop-pin 100 and through the lateral displacement of the casing 105, the lever 109 disengages the gear 11, so that the conveying-wheel A loses its impetus. The conveying-wheel A rests not only upon the axis B, but also in a bearing 112 and bears upon its lengthened nave the tooth-wheel Z. This tooth-wheel Z locks, through an intermediate wheel, into the impelling wheel 113 which is loosely arranged upon the coupling gear 114 and which is maintained in permanent rotation by the pulley 116 through the tooth-wheel 117, so that the tooth-gear is also in constant rotation. The tooth-gear is pressed by a pressure spring against the tooth-wheel 113, the left end of which forms a tooth-gear, but is here impeded by a second arm of the lever 109 provided with a roll.

In order to make it possible to couple the rotating tooth gear 111 with the tooth-wheel 113, the lever D which rests upon the socket 119 must be displaced toward the left, whereby the lever 118 is also engaged which causes the withdrawal of the stop-pin 100 from the plate W. The conveying-wheel A is thereby released and the lever 120, which is lodged on the same socket 110 as the lever D, is at the same time moved in such a manner as to press upon the latch 104 which is released by the pawl 107. The coupling lever 109 loses its hold and the tooth gear 111 is allowed to catch into the coupling teeth of the tooth wheel 113, whereby the latter transmits the rotation to the wheel Z and, thus, to the conveying wheel. The conveying wheel then rotates as far as the next arresting plate W which, in its turn, disengages the coupling 111 in the above described manner. The pulley 116 receives impetus from the pulley 121 which, together with the large pulley 123, is fastened upon an axis 122 which rests in the table frame. The pulley 123 is then impelled either from the transmission or with the aid of a motor. The matrices to be set are taken from the matrix collector E to which they are taken through the slanting channel shaped receptacle G. Since the conveying wheel A is always stopped in such a way that one of the four matrix line holders $C^1$, $C^2$, $C^3$, $C^4$ always stands opposite the matrix collector E, the matrices which, during a quarter revolution of the conveying wheel have been taken to the collector E, may be inserted in the respective line holder, as is later described.

The matrices, most advantageously used with the new machine, are almost circular plates at their entire circumference provided with types, and they lie flat, one behind the other, in the channel shaped receptacle G so that they may roll down in these into the matrix collector E. Every matrix 1 (Fig. 3) contains twelve different types of the same width, for example $i$, 1 etc., or the Figs. 1, 2, 3, 4 . . . or other characters of the same width, while another matrix has twelve different types all of which are of the same width, though of a greater width than the first named matrix. The matrices which contain the narrowest number are, therefore, thinner than those which contain wider types. The circumference of the matrices is evened in such a manner as to form a polygon with twelve equally long sides. Each side of the polygon is recessed in the center, and the various types are pressed into this recess.

Since each matrix holds twelve different types and 96 types are needed for printing, only eight different matrix-disks are required for the new machine, and the chute shaped receiver G is accordingly divided by means of thin partition walls (Fig. 11) into eight compartments each of which compartment holds matrices of the same kind, while the matrices of the different compartments have different types. In other words all the matrices in one compartment are duplicates, but they differ from those in another compartment. The matrices in the different compartments of the receiver G are held fast by the matrix-holders 12 of which one has been provided for each compartment, until they are released by striking the respective key of a key-board F (Figs. 9 and 11).

The release of the lowest matrix of one of the compartments of the receiver G is effected by striking the key lever on the keyboard F which shows on its press button one of the types engraved in the matrix which is to be released. If the respective key lever, for example 13, is pressed down (the other key levers have for the sake of clearness been omitted), then its second end turned away from the press button raises the cross rail 14 (Fig. 9) guided parallel along both ends. This cross-rail 14 has on the upper edge two cams 14$^a$ and 14$^b$, the rear one of which (14$^b$) lifts the lower lever arm 15$^a$ of the double arm lever 15 into position. The lower lever arm 15$^a$ has, along the entire length of the key-board, the form of a rail, and, only at the left end where it is connected with the lever 16, it has the form of a narrow lever. The lifting of the cross-rail 14 (which slides forward in a slanting fashion in the direction of the arrow) causes the rear cam 14$^b$ to press upon the rail-shaped end 15$^a$ of the double lever 15, and to lift this end into position. The double lever 15 has, in the center, the form of an axis and is placed in a rotatory position, so that, by lifting its end 15$^a$ into position, its second end (which is connected with the lever 16) performs a revolution and presses upon the likewise angular stop-lever 16 which holds up the matrix holder 12 which stands under the influence of spring 17. The stop-lever 16 also has in the center the form of an axis, and its arrangement is clearly visible in Fig. 9. Its downwardly pointing end, which is connected with the lever 15, is fastened on the right side over the key-board F. Its axis 16$^a$ extends beneath the matrix holder 12 and is there provided with the second lever arm which points upward and holds the matrix holder 12. In order that the lever may keep its position, it is pressed by a spring against the matrix holder 12, in such a manner that its lower end 16$^b$ exerts a pressure upon the lever arm 15. As soon as the key knob of the lever 13 has been struck, its second end (as described above) raises itself and lifts also the cross-rail 14 into position, which lifts with the cam 14$^b$ the rail-shaped end 15$^a$ into position, whereby a rotation is transmitted to the lever arm 16$^b$. The second upwardly pointing end of lever 16 lowers itself and causes the matrix holder 12 (which is lodged upon it) to slide downward with the aid of spring 17. This matrix holder 12 is equipped with an arm interlocking with the receiver G which prevents the dropping of the lowest of the matrices reposing in the receiver G. If, then one of the types engraved on the matrix 1 is struck on the key-board F and the matrix holder 12 thereby deprived of its support, the spring 17 in consequence of the inclined slots 12$^x$ and its supporting pins 12′, as illustrated in Fig. 9, draws it down in a slanting direction so far that the lowest matrix may freely drop to the bottom. However, while the matrix holder 12 is being drawn back the angular cog 18, placed at the receiver G in a position permitting of rotation, the one arm of which is linked with the matrix holder 12 is, through a cleft in the wall of the receiver G, turned into the latter in such a manner that it prevents the second last matrix from dropping.

In drawing down the matrix holder by means of spring 17, the matrix holder 12 hits upon the hoop shaped lever 19 which stands under the constraint of a spring and is fastened in a rotatory position to the pedestal 20, and thereby lifts the end 19$^a$ of this lever 19 (Figs. 9 and 10) the width of which rises in a sloping direction and by which a coupling pin 21 is held. This coupling pin 21 serves for the coupling of the constantly running cog wheel 22 with a stirrup 23 serving the purpose of raising again the matrix holder 12 drawn down by spring 17. The cog wheel 22 revolves in the pedestal 20 and on the nave 25 of this cog wheel the stirrup 23 is also arranged in which rests the coupling pin 21 (Fig. 10) which stands under constraint of a spring and is by means of its spring, constantly pressed against cog wheel 22. The cog wheel 22 derives its constant rotation from the groove wheel 24 fastened to the common nave and is, in its turn, put into rotation by the gear K. The cog wheel 22 is equipped with a cleft for the coupling pin 21 so that during the rotation of this wheel the pin 21 jumps into the latter as soon as the cleft of the cog wheel has come to the proper position. To the stirrup 23 is fastened the small roller 23$^a$ in a rotatory position so that when cog wheel 22 and stirrup 23 are coupled with each other the matrix holder 12 is raised again as soon as the roller 23$^a$ gets beneath it. Through the lifting of the matrix holder 12, the lever 19 is balanced and rises again whereby its slanting end 19$^a$ pushes the coupling pin 21 back again into the stirrup 23. The stirrup 23 (Fig. 10) is, thus, again disengaged and is held fast at the slanting end of the lever 19 (Fig. 10) by means of a small elevation, until the matrix holder is again being drawn downward, because the stirrup 23 is loose upon the shaft 25 and cannot rotate until the coupling bolt 21 which is lodged in the stirrup is released by the slanting end 19ᵃ of the coupling lever 19. This takes place only when one matrix holder 12 has been disengaged by striking the key and when it, therefore, presses upon the lever 13. The end 19ᵃ rises, allows the coupling bolt 21 to catch in the coupling cleft of the tooth wheel 22, and engages the bolt together with the stirrup 23.

With the relifting of the drawn down matrix holder, all parts movable by the striking of the key resume again their primary position (Fig. 9). However since the receiver G contains eight compartments (Fig. 11) each of which holds a separate series of matrices, there must naturally also be provided for each compartment or matrix series the described contrivance for the holding and releasing of the lowest matrix. The machine contains, therefore, eight matrix holders 12 lying side by side, eight angle levers 15—15' (Fig. 9) and eight cross rails 14 (Fig. 11).

The matrices freed from each of the drawn down matrix holders drop into the collector E. The collector E is, therefore, so broad at its upper end (Fig. 11) that all compartments of the receiver G may empty into it while it then tapers flat, (Fig. 5) in such a manner that the dropped matrix standing up perpendicularly gets into the matrix collector E, and is there seized by the small revolving roller 26ᵃ and put into rotation.

The small rubber wheel 26 as well as the one opposite it, 26ᵃ are situated within the collector, while their axles penetrate through the side walls of the collector and are impelled from without. For this purpose, the axles of each of the small rubber wheels 26, 26ᵃ are placed in a rotatory position in a case of which the one belonging to the small rubber roller 26 is inclosed in a rubber ring 50, (Figs. 6 and 10,) which stands in permanent contact with the small friction wheel 49 whose axle bears a small conic cog wheel 22ᵃ meshing with the cog wheel 22 (Fig. 10) which, as already mentioned, is constantly turned. The small rubber wheel 26 rotates, therefore, also constantly, but not the second small rubber wheel 26ᵃ which has only the object of preventing the matrix turned by the small rubber wheel 26 from overturning, in this way that, standing exactly diametrically opposite the small wheel 26, it presses against the rotating matrix. The small rubber wheel 26ᵃ is, therefore, at rest until one matrix has dropped into the collector E and has been put into rotation by the small rubber wheel 26; then, however, it is turned by the rotating matrix.

The revolving of the matrix purposes to properly adjust that one of its types which corresponds to the key struck on the key board F (Fig. 2) because, as already mentioned, the entire circumference of the matrix is equipped with twelve types differing from each other among which the one struck is to be found. We have seen that each matrix holds twelve different types, since now by the striking of the desired type not only it, but a matrix, is forwarded to the collector, a matrix which holds apart from this type still eleven different types, the matrix is to be so adjusted that the type struck forms, after the insertion of its matrix in the matrix holder, a straight line with the later adjusted types of the matrices inserted farther in the matrix holder, and this is brought about by turning. In order that the rotation of the matrix may take place quickly and smoothly it is provided with a central boring 2 (Fig. 3) into which is shoved the spur 28 forming the axis of the piston 40 (Figs. 5 and 6). The matrix holder is, therefore, at its lower end shaped in such a manner that the matrix dropping into it must fall between the small rubber wheels 26, 26ᵃ and the piston 40 in such a fashion that the central boring 2 of the matrix 1 (Fig. 3) lies exactly in the direction of the spur 28, and that this spur must then when advanced penetrate into the central boring of the matrix. The advancement of the spur 28 is also effected by means of the constantly revolving cog wheel 22. The cog wheel is, as previously described, periodically coupled with the stirrup 23, and with this stirrup the rotary cam 41 (Fig. 10) is united into which is carved the curve channel illustrated in Fig. 10. With the curve channel is geared the rear arm on the intermediate lever 42 (Fig. 9) with which the two armed lever 27 is linked. The free end of this lever 27 rests in a groove of spur 28 and moves said spur to the left and back for the purpose of inserting the matrices in the collector E in the adjacent line holder C.

Since now, as previously described, the coupling of the cog wheel 22 with the stirrup 23 takes place at once when the matrix holder 12 has released the lowest matrix in one of the compartments of the receiver G and the former has dropped into the collector E, there begins immediately afterward the advancement of the spur 28 which shoves itself into the central boring of the dropped matrix lying in the collector E, and the small rubber wheel 26 can now easily put into rotation the matrix which rests on spur 28. This rapidly turned matrix must now, as mentioned, be retained so firmly in one position that the struck types of all dropped down matrices form a straight line when the matrices are shoved into the line holder. For this purpose all matrices possess in the same place the eccentric hole 4 (Fig. 3) while the piston 40 in front of which the matrix rotates is provided with twelve borings I'—XII' (Figs. 7 and 9)

corresponding with the pins 29 (Fig. 8) which stand under spring constraint and penetrate through the rear wall of the collector E. These twelve perforations of the piston 40 correspond, therefore, to the twelve pins and the latter again to the twelve types for which provision has been made on the circumference of the matrix. If now all of the pins 29 are kept drawn back and later, when the matrix has dropped into the collector E and has been put into rotation by the small rubber wheel 26, one of them is released, then the one of the pins 29 which has been released trails on the matrix until it catches in the matrix boring 4. This occurs as soon as the matrix boring appears before it, and it holds the matrix fast so that, therefore, in releasing a certain one of the pins 29 the same type of the rotating matrix is always placed in position. When, for example, the bolt 29, which corresponds to the perforation IX' of the piston 40, has been released, it catches in the matrix as soon as the perforation 4 of the matrix covers the perforation IX', and this matrix 1 assumes, for example, the position shown in Fig. 3. If, however, the bolt which rests in the perforation X' of the piston is released instead of bolt IX', the matrix turns to the extent of one twelfth of its circumference farther beyond the position illustrated in Fig. 3 until its perforation 4 covers the perforation X' of the piston and until the released bolt (which rests in this perforation of the piston) catches in the perforation 4 of the matrix at that moment when perforation 4 and perforation X' of the piston register with each other as the matrix rotates. The matrix which has now been adjusted shows, therefore, (since it has rotated to the extent of one twelfth farther than the preceding one which was adjusted by the pivot resting in the perforation IX') an adjusted character which differs from that of the preceding matrix. Since the circumference of each matrix bears twelve types, while all matrices taken from the same receptacle carry the same types in the same order of succession and in the same position to the matrix perforation 4, the adjacent character is, in the second one of the above discussed matrix adjustments, adjusted by that character which was adjusted with the aid of the perforation IX'/IX of the piston. Each of the twelve pins 29 (Fig. 8) which have been illustrated in Fig. 7 as resting in the piston borings I—XIII' adjusts thus, when projected, one certain type of the rotating matrix in the horizontal center line of the latter, and this center line is to be denoted as molding line because all types of the different matrices adjusted to this line are later molded into a line. The pins 29 standing under the constraint of the surrounding springs 33 are uncoupled by the slides 21 which are, for this purpose, bordered by slanting planes.

Each of the pins 29 is provided at its rear end with a ring 39 which is placed in a firm position by pin 38; against this ring acts the slanting plane of the corresponding slide. These slides which are to be denoted as detaching slides are, as may be seen from Fig. 8, arranged in two rows 31, 31ª in such a manner that those of the one row may put into action the pins 29 located within the lower piston borings I'—VI', and those of the other row those located within the upper piston borings VII'—XII'. The detaching slides are moved by striking the letter on the key-board F (Fig. 2) whereby, as already described, cross rail 14 (Fig. 9) is raised the rear tooth of which sets the matrix holder 12 to work. Tooth 14ª on rail 14 acts upon one of the detaching rails 30 (Fig. 9) by which are supported the detaching slides 31 so that the pin 29 which corresponds to the key struck is projected as soon as desired. As the pin spring 33 presses with one of its ends against the small plate 34, the detaching slide 31 which has been shoved to the front is held fast until it is again withdrawn, and this is done by means of the rack 35 which engages with the lower ends of said slides 31. This rack is described in detail hereinafter. The disengaging slides 31 are, as stated, arranged in two rows and placed beneath two plates of the matrix collector E, from which they protrude below. The protruding end of the disengaging slides has a hook-like shape and is here in each instance being drawn downward by the toothed slide-rod 35. Each of these disengaging slides is so long as to extend with its upper end beyond the bolt perforations I' to XII'. The end of this upper portion of the disengaging slide is pierced by the stop-bolt 29 which is then released or withdrawn by the slanting plane 31ª. In order to make it possible for the disengaging slide to slide to and fro, it has been provided with an oblong perforation through which passes the bolt 29.

The matrix which, by means of the projected pin 29 has been adjusted in the proper molding must make room for another matrix and, therefore, be removed from the matrix collector, without therewith changing its correct position. This is done by the spur 28, on which the matrix may rotate. During this feed, the spur 28 hits with its port which carries the groove, in which rests its motion lever 27 (Fig. 5) against the long nave of the piston 40, but only after the pin 29 has penetrated into the eccentric boring 4 of the matrix. The front surface of the thick part 40 shows two diametrically opposed elevations 40ª and 40ᵇ and a backward pointing arm which guides itself in the rear wall of the collector receptacle E. When the piston 40, which inserts the adjusted matrix in the line holder advances, then the elevations 40$^a$ and 40$^b$ place themselves over the straight outer wall of the matrix and thus, prevent the latter from turning out of position while it slides forward. As a matter of fact, the backward bent arm also goes along while the matrix slides forward, thereby shutting the collector so that no matrix can previously fall into the same. As this further projection of the piston 40 would be prevented by the small rubber wheels 26 and 26$^a$, the latter must be withdrawn, and this is done by the same lever 27, which as before stated, shoves the spur 28 to the front. To the nave of this lever 27 a cam with circular bottom end 27$^b$ is fastened which, during the revolution of the lever 27, hits against a small roller upon the arm of the angle lever 48. The other arm of the angle lever is joined to the axis which bears the small rubber roll 26 (Fig. 6), so that the revolution of the angle lever 48 around pivot 54 caused by the revolution of the angle lever 27 causes a withdrawal of the small roll 26. However, angle lever 43 is connected with the double arm lever 48$^a$ by means of the connecting rod 47$^a$, and since lever 48$^a$ is in the like manner joined to the axis of the small rubber wheel 26$^a$, just as the lever 48 is joined to the axis of the small rubber roll 26, the small roll 26$^a$, also, is simultaneously with the small roll 26 removed from the path of motion of the piston 40. On the pin of the lever 48$^a$, which, because belonging to the latter has also been marked 48$^a$ (Figs. 7, 7$^a$), is fastened the cam 55 by which the slide-rod 35 is moved which, as previously mentioned, actuates the disengaging lever 31 (Figs. 7 and 8) at its lower hook-shaped end. The path for the matrix is, therefore, free and the latter is now shoved by piston 40 from spur 28 upon spur 51 which is fastened in the matrix line holder C. This is thereby made possible that spur 28 is constructed in two parts. The front part of spur 28 rests within its tube shaped rear part, and between both parts in the rear part of the spur is placed a spiral spring as may be seen from Fig. 5, so that spur 28 contracts when its front part hits upon the solid spur 51 in the matrix holder C. The piston 40 may then continue its progress without obstacle.

In order that the mentioned withdrawal of the small rubber wheels or rubber rollers, may occur without jamming of the pin, the casings in which the pins of these rollers rest are fastened on the horizontally rotary plates 43, 43$^a$ (Fig. 6) and the motion of the angle lever 48 is transferred to plate 43 by spring 53 which, with one end, is fastened to the angle lever, with the other to a nave of plate 43. Plate 43 is connected with plate 43$^a$ by the connecting rod 47 illustrated with dotted lines in Fig. 6, so that both plates perform one revolution with the aid of the angle lever 48. The revolution of plate 43 and, consequently also that of plate 43$^a$ is limited by striking peg 44. The plates 43, 43$^a$ as well as the described feed device are stored upon or in frame 46 which, in its turn, is again fastened on the general machine frame. The previously mentioned withdrawing of the pin 29 which arrests the matrix in the proper position is, as already mentioned, caused by the rack 35 with the aid of the cam 55 (Fig. 7$^a$). The catch 56 arranged on cam 55 is elastic and, during the revolution of the cam in the drawn direction of the arrow, it is pressed back into the cam when it strokes past pin 57 riveted in rack 35, and projects again after the passing of cam 55. During the following retrograde motion of the piston in which the previously withdrawn rubber rollers 26, 26$^a$ advance again and the levers 58, 58$^a$ also revolve, the spindle of the latter lever in the frame plate 46 (Figs. 6 and 7) also revolves and since cam 55 is fastened on the spindle of lever 48$^a$, the retrograde motion of the angle lever 27 causes also the retrograde motion of the cam 55. The spiral catch 56 (Fig. 7$^a$) is only so long as to release pin 57 before the final position and before the rack 35 is drawn back to its original position by its spring 58 (Fig. 7) which has been tightened by being shoved to the front. Rack 35 in its turn then draws back the slide 31 and the latter the projected pin 29. The collector is thereby again rendered competent for the reception of further matrices, and its described functions are repeated with each letter struck on the key-board F.

The matrices inserted in the matrix line holder C must as soon as they form a word, be divided as usual by a space and it is, therefore, necessary that also the spaces be inserted in the line holder by piston 40. For this reason the spaces are, like the matrices, provided in the middle with a central boring 9 (Fig. 4) and have the shape of a level plate with a flat cavity 10 on the side into which is inserted the rectangular shaped spring 7 with its rectangularly bent off part 11. This angular spring 7 slightly stands off of the space plate 6 and holds fast the three armed spring 8 bent in the shape of a dish as may be seen from the cross section according to Fig. 4. The new space is therefore an elastic one which is distinguished from the well known elastic spaces by its new construction which makes it possible that the matrices between which the space lies may be displaced to each other when the matrix line is being put together.

When the matrices are being pushed together, the angular spring 7 is forced inward the space plate 6, and at the same time, the dish shaped spring is squeezed flat. While the flap 11 of the angular spring 7 shoves itself deeper into the notch 10 on the side of the space plate 6, the arms of the dish shaped spring 8 covered at the end by this angular spring may slide beneath the angular spring 7. When the pressure upon the matrix ceases, as occurs for example when the matrix line is being taken apart, then the dish shaped spring 8 resumes again its original shape, and the arms reaching under the angular spring 7 also raise the angular spring 7, so that all parts occupy once more the position illustrated in Fig. 4.

In accordance as they are needed, the spaces are inserted between the matrices, and they serve for spreading out the line over the proper length. The insertion of the spaces is done by means of striking the key of the lever 75 (Fig. 11ª) which rests on the left side of the key-board F in a special bearing 125 and is permanently connected with a second lever 126. By pressing down the lever 75, the end of the lever 136 is raised, whereby the arm of the engaging lever 127 together with the cam 128, is caused to be lifted into position; this cam, in turn, presses the lower end of the movable advance-slide 129 upward, whereby the cam-like end of the latter is lowered, while the advance-slide 129 is brought into that position which is indicated by means of a dotted line in Fig. 11ª. In this position, the roller 23ª, which is arranged at the eccentric stirrup 23, engages with the advance-slide 129 which advances one space from the magazine 130 and shuts, at the same time, the space receptacle 131 so that another space may come within the reach of the advance-slide 129 only after the return of the latter. The space is placed by the advance-slide 129 within the reach of the collector piston 40 which thrusts it into the line-holder. The roller 23ª arranged at the stirrup 23 leaves the advance-slide 129 immediately after the latter has adjusted the space in the proper position, and is again drawn back into its original position by a spring which is not visible in the drawing. Thereby the path is cleared for the next space which assumes the position from which it may now be advanced. The double-arm lever 127 does not only lower the cam-like end of the advance-slide 129, but also couples the stirrup 23 at the moment when the advance-slide 129 has arrived in the position indicated in Fig. 11ª by dotted lines. The coupling is done in the same manner as the disengaging of a matrix, only with this difference: that the slanting end 19ª of the lever 19 is lifted into position by the hook-shaped end of the lever 127, instead of by the matrix holders 31. The spaces are located in a receptacle 131 (extending from the highest point of the wheel A) in which they slide toward the place of issue while the matrix line is being distributed, and by their own weight.

The matrix or space inserted in the matrix line holder is held by the stop pawl 59 (Figs. 6 and 7) let into the collector wall 60 (Fig. 7) in such a way that it can no more return to the collector. For this purpose the stop pawl as illustrated in Fig. 6, has been placed under spring constraint so that the matrix or the space presses back pawl 59 when the matrix is being inserted whereupon the pawl then projects again, and since it can only revolve in one direction it prevents the matrix from returning into the line holder. In the matrix line holder C opposite the stop pawl 59, there is also arranged a pawl 61 (Figs. 6 and 15) of the same effect as that of the stop pawl 59 so that the inserted matrix cannot overturn. If, in the matrix-line holder C only the pawl 59 were arranged, then the inserted matrix might leave the line-holder on the opposite side and place itself in a slanting position, and thus overturn. The arrangement of the second pawl 61 prevents this.

The construction of the collector upon the pin 51 of which the matrices and spaces are shoved one after the other, may be observed from the Figs. 13 to 16. The matrices and spaces shoved upon the spur or pin 51 place themselves when being inserted against the piston 62 which is movable along the spur, the piston being pressed farther to the right by each additional matrix. Two tooth-racks 63, 63ª are screwed into the piston 62 which catch in the small wheels 64 resting on a joint shaft 65; only one of these wheels is visible which is connected with the watch spring 66 in such a manner that the latter is wound by the rotation of the small wheels 64. This takes place in the case of each newly inserted matrix or space which presses the piston 62 (Fig. 14), every time farther on to the extent of their thickness, and bend thereby, with the aid of the tooth racks 63, 63ª (Fig. 12) as well as of the small wheels 64, the watch spring 66. This spring remains in a bent condition as long as the matrix line is locked in the line holder, i. e. during the transportation to the pot and during the casting. However, when the cast line has reached the distributer, then the line holder opens itself and the bent spring 66 presses the matrices out of the line holder upon the distributer.

The matrix line holder is on one side provided with a line tail piece 67 (Fig. 16) which, during the setting of the line pressed by spring 68, points upward and holds the matrix line holder C open so that the matrices may be introduced as described. The line tail piece 67 consists of a steel plate which is fastened to the line holder C on the right side by means of a screw 67ª, in such a manner that the tail piece may rotate around this screw, whereby the line holder is opened and shut. If the transporting wheel A which was at rest until the completion of the line is turned farther by means of engaging lever D (Fig. 1), the matrix line holder must be closed lest piston 62 which stands under constraint of a watch spring displaces the inclosed matrix, for as we have seen, only the tooth 61 is fastened on the matrix line holder, while the other one, 59 is fastened to the collector frame. The closing is done by touching the bracket 70 (Fig. 13) with the line tail piece 67. The process is as follows: In shutting the line tail piece 67 (Fig. 14), the pin 72 (which is riveted in the latter) lifts into position the cog 71 (which stands under spring pressure). However, immediately after the passage of the pin 72, the cog drops down behind it.

For the purpose of relieving the spindle screw 67ᵃ, the right end of the thorn 51, which is fastened in the body of the line holder, is formed in such a manner as to form a knob against which leans the line tail piece in its tail position (Fig. 14), whereby the latter is secured against lateral displacement. This securing method is necessary because the piston 62, which stands under spring pressure, has the tendency to press the line tail piece 67 aside.

The spaces reach the line in a broad spreading condition, i. e. they have the greatest possible width permitted and conditioned by the springs 7 and 8 (Fig. 4) and they must first be pressed together in the matrix line to the normal measure whereby the line becomes firm. Since the spaces have the purpose of filling up the intermediate spaces between the different words in such a manner as to actually fill up a remaining space at the end of the line, they are more or less compressed in the line between the matrices according to the necessity arising from the space lacking in the line. If, for instance, six spaces are contained in the line and if the line is complete, so that the exact length of the line has been reached, then the spaces remain between the matrices in that state in which they were inserted, and the line may, nevertheless, be cast. If, however, a syllable or a word is still to be added at the end of the line which contains the six spaces, then the line is made longer thereby, and the spaces must then, before the casting takes place, be compressed to the extent of this additional length, so that the line retains its normal length. By compressing the spaces between the matrices in such a manner as to give the line its normal length, the line becomes ready for casting. This is done in the following manner. The piston 62 (Fig. 12) is on its left surface, provided with a screw plane 77 which forms the counterpart of the screw shaped casing 78 equipped with a spur gear. The casing 78 is placed in a rotatory position on spur 51 and stands in connection with lever 79 which ends in a tooth segment (Figs. 12 and 13). The lever 79 may revolve around the pin 80 bored into the line holder C and is bent downward by the spiral spring 81 (Fig. 15). However, it is prevented from moving downward by lever 82 which is opposed to lever 79 in the relative position in which the line is set of the line holder to the matrix collector. Every time the space key 75 (Figs. 9 and 11) is struck, the lever 82 is moved back a trifle from the lever 79, so that this lever may drop to a corresponding extent under the influence of spring 81 (Fig. 15). Its tooth segment then causes the withdrawal of the piston. This withdrawal as well as the motion transference of the key lever 75 occurs in the following manner: The space lever 75 is, as may be seen from Fig. 11, connected by a link 75' with shaft 86 so that the striking of space lever 75 produces a small revolution of the shaft 86. This shaft 86 is, as may be seen from Figs. 11ᵃ and 15, connected with shaft 83 by means of segment 84, cog wheel 85 and an engaging and disengaging coupling 87 (Fig. 11ᵃ), wherewith the coupling sleeve fastened on shaft 86 stands under the influence of spring 88, while shaft 83 stands under the influence of the spiral spring 89 (Fig. 15). By striking the space lever 75, the latter moves downward as usual, thereby puts shaft 86 to partial rotation and thereby again the cog wheel 85 coupled with the latter, which interlocks with the inner denture of the segment 84, so that the lever 82 fastened to shaft 83 of the tooth segment 84 is moved along in the direction of the arrow.

By the revolution of shaft 83 the spring 89 which surrounds it is tightened for the purpose of being able to finally take back the lever 82 to its original position. But since this can only happen after the setting of the full line, i. e. after the introduction of all spaces necessary for the line, the small cog wheel which brings about the motion of the lever 82 must, for the time being, be made fast and this is made possible by the fact that the tooth segment 84 as may be seen from Fig. 13 is not only equipped with the inner denture interlocking with cog wheel 85, but, in addition to that, also with an outer denture in which catches the disengageable cog 90. The tooth segment 84 may, therefore, rotate with the aid of cog wheel 85 in the arrow direction, but cannot be turned back by spring 89 acting upon its shaft 83, before cog 90 has been disengaged. By striking space key 75, the tooth segment 84 and, consequently also the lever 82 is turned to a certain extent in the direction of the arrow and is then retained in its new position by cog 90 which has caught in the outer denture of the tooth segment 84 and rests upon the bracket 70. The lever 79 has herewith under the pressure of its spiral spring 81 (Fig. 14) lowered itself so far until it hits against the arrested lever 82. The toothed extremity of lever 79 herewith turns the casing 78 in the direction indicated by the arrow thereby withdrawing piston 62 so that the space indicated in Fig. 15 by the extended arrow is enlarged for the reception of the broad spread spaces.

If the line is inserted in the line holder with all its spaces, it must be compressed again before the molding of the line, and this is done during the further revolution of the conveying wheel to the extent of one quadrant. On the shaft of cog 90 (Fig. 13) a disengaging lever 91 (Figs. 11, 11ᵃ) has been arranged for the cog 90 in such a manner that the line holder C' (Fig. 1) during its downward revolution from position I to position II hits against the disengaging lever 91, presses it down and thereby turns the shaft of cog 90 in such a way that the latter is disengaged from the outer denture of the tooth segment 84. However, at the same time the coupling 87 (Fig. 11ᵃ) is disengaged by the revolution of the shaft of cog 90. Apart from the disengaging lever 91 there is fastened on the cog shaft another bolt shaped cam 92 (Fig. 11ᵃ) which during the revolution of the cog shaft shoves back the part of the coupling 87 fastened to shaft 86 thereby tightening the spiral spring 88 and disengaging the coupling of the small wheel 85 with the shaft 86. The lever 79 of the downward moving line holder hits against the round part (Fig. 13 dotted) of lever 82 and raises itself again so that the casing 78 now performs the reverse motion, as previously described, whereby the piston 62 is advanced again and the space indicated by the extended arrow in Fig. 15 enlarged. In this position the casing 78 is then arrested by a pin 93 (Fig 15) which rests within the line holder and stands under spring constraint. This pin 93 is held drawn back by the hook shaped arm 94 (Fig. 15) of the bracket 70 as long as the line holder is in front of the matrix collector (Fig. 5) in order to permit the setting of the line. However, during the downward turn of the line holder in which the pin 93 which is fastened to it is, of course, also moved downward and gets beyond the reach of arm 94 of the bracket 70, the pin is by its spring pressed into the line holder and herewith catches in a round shaped curling a (Fig. 12) of the casing 78. The latter is hereby made firm so that piston 62 cannot move back, and thereby the adjusted line is held firm, also during the further revolution by the conveying wheel A. The matrix line holder which is now in position III is placed in a horizontal plane, as may be seen from Fig. 1, with the movable molding pot J resting on rollers. Beside each of the line holders C'—C⁴ is a striking peg W (Fig. 2) fastened to the conveying wheel A and that one which brought to the setting place by means of the revolution of the conveying wheel, hits against a lever which sets into motion the shaft B of the conveying wheel. The casting mold L (Fig. 1) which is to be found on the rear side of the machine is hereby inserted between the molding pot J and the matrix line holder C³. During the progressing revolution of shaft B, the molding pot is pressed against the casting mold by the slide plate M (Fig. 1) which is tightly wedged in on the former and then effects in the known manner the molding of the line whereupon the molding pot is again withdrawn and the casting mold moved sidewise out of the conveying wheel. The trimming and the expulsion of the line from the mold may then proceed in any known method.

After the molding of the line in position III has been completed it proceeds to position IV where the depositing of matrices and spaces takes place. Here the hook shaped pin 93 (Fig. 15) is drawn out by some part which is similar to arm 94; whereby the casing 78 is released and, by spring 81 with the aid of lever 79 (Figs. 12, 13, 15) so turned that line and spaces are freed from the pressure of the piston 62. In the meantime the trigger pin 71, (Fig. 14) interlocks with a firm catch, is pressed back and releases the pin 72 which, pressed by spring 68 opens the line tail piece. The latter here opens wide enough to hit upon catch 95 (Fig. 16) which is fastened to the line holder itself, and in this process the stop lid 61 goes back so far that the matrices' exit is not impeded and that they are pressed out together with piston 62 which is weighted down by watch spring 64.

The position of the line tail piece in position IV has been represented in Fig. 16.

Close on the matrix holder C⁴ borders the distributing rail 96 (Figs. 2 and 17) and by the piston 62 which stands under spring constraint (whose spring was tightened as described during the inserting of the matrices,) the matrices are shoved on to the distributing rail 96 which has the shape of a reversed T and the foot of which is provided with notches of varying width. In order to make this possible the matrices 1 (Fig. 3) have been provided with clefted borings 5 corresponding in number to that of the number of types, one of which borings is, in each case placed opposite to the upper end of the distributing rail, as the types set in a line retain their position in the matrix line holder until their expulsion from it, as described. The matrices hang, therefore, after being pressed out of the line holder, with their borings 5 on the distributing rail and slide downward on it. The matrices which hold the same types have the same thickness, but differ in thickness from the matrices which hold other types, so that the matrices sliding downward on the distributing rail 96 drop through the notches of the foot of the distributing rail corresponding to their thickness, into the running channels 97 (Fig. 17) of the collector G (Fig. 2) from which they are again taken by means of keys. Since the spaces have no borings for the distributing rail, they slide into the first channel. The distributing of the matrices has been illustrated in Fig. 17. From position IV the emptied line holder C reaches by a further ¼ revolution of the conveying wheel A, the position I (Fig. 1) where the open line tail piece 67 is slightly raised by striking on the set screw 69 (Fig. 13), so that the stop lid 61 of the line tail piece 67 projects into the open space of the line holder and prevents the inserted matrices from leaping back. The lever 79 is raised upward by striking upon the lever 82 and the matrix line holder enabled to receive further lines.

In order to make it possible to furnish with the rotary line setting and casting machine also mixed composition with the same speed like that required for simple composition, it will be necessary to make those modifications shown in Figs. 18 to 23.

Fig. 18 shows that the rotary setting machine is provided with two separate matrix magazines $G^1$, $G^2$. However the latter pass over into one common upper portion with which they are rotatably connected by means of joints. This connection is such that the matrix magazine $G^1$ is adapted to be turned horizontally with regard to its upper portion, while the joint of matrix magazine $G^2$ is adapted to be moved vertically with regard to its upper portion. Matrix magazine $G^1$ is intended for a common writing type, while the matrix magazine $G^2$ contains the matrices with the capital letters, and as the latter matrices are used in smaller number than the former the smaller capacity of matrix magazine $G^2$ constitutes no disadvantage. As has been described, the matrix magazine $G^1$ (Fig. 18) is connected with the disengaging mechanism actuated from the key board so that, when the keys are depressed, it delivers the matrices into the collector E.

Matrix magazine $G^2$ rests on top on the matrix magazine $G^1$ and, in order that the matrices contained in the former may not slip out, they are prevented by a pin —o— from slipping out which is passed through the sides and the central perforation of the matrices and which can be withdrawn, if necessary. The matrices used in this case are nearly identical with those shown in Fig. 3, that is to say, they are round, with a perforation in the middle, and through said perforations of the undermost matrices pin —o— is passed so that these matrices are thus firmly secured in position.

When common writing type has to be set, the matrix magazines $G^1$, $G^2$ occupy the described position shown in Fig. 18. However, if one or more lines have to be set in capital letters, then the matrices in magazine $G^1$ are secured at first in the specified manner by means of inserting a securing pin being similar to pin —o—, magazine $G^2$ is then slightly lifted with the left hand so that magazine $G^1$ can be turned with the right hand toward the side upon a support R (Fig. 19) and thereupon magazine $G^2$ is lowered upon the collector E and pin —o— is withdrawn from the undermost end of magazine $G^2$. After these manipulations, the setting of the capital letters can begin at once and considering that such change of the matrix magazines $G^1$, $G^2$ requires but a few seconds, it brings about no delay that might be of any consequence in practice.

In order that those matrices carrying the capital letters may take their separate passage from the common matrix line holder C into the magazines $G^1$, $G^2$, the matrices $M^2$ (Fig. 22) that carry the capital letters are distinguished from the remaining matrices in such a manner that their perforations 5 for distributing are provided with wider openings than the corresponding perforations 5 of the lower matrix disks. Fig. 22 shows this in the two matrix disks placed side by side, M' designating the common writing-type, while $M^2$ represents the matrix disk provided with capital letters. Both kinds of matrices are therefore composed to one line, they are then inclosed in the line holder C and are carried by the conveying wheel A to the place of distribution IV (Fig. 18), essentially as described. When they have arrived here, they are again pressed from the line holder C upon the distributing bar 96 where the matrices with wider opening occupy immediately a deeper position, as shown in Fig. 22, than the matrices M' the perforations 5 of which contain a narrower opening. The matrices then slide down on this distributing bar and, as soon as they have reached a groove corresponding to their thickness, they fall into their magazines $G^2$, G', respectively. The distributing bar 96 (Fig. 23) carries, to this purpose, each time two series of grooves —a— and —a'— of equal width. As shown in the cross section represented in Fig. 23, the grooves —a— traverse the distributing bar as far as to its blade-shaped portion so that the matrices provided with narrow openings, id est, matrices M' can fall through without hindrance. The grooves —a'— traverse, on the other hand, in part, the bulging lower portion of the distributing bar so that the matrices M', with their narrower opening, cannot fall through because their narrower opening causes them to remain suspended on the projection of the rounded portion and to slide farther down as far as to the slit intended for them through which they fall into their cells.

As has already been mentioned, each matrix is provided with twelve different letters upon which depends the thickness of the respective matrix. However, the possibility is not precluded that in some type more than twelve letters may have the same width rendering necessary a second matrix which is made of the same thickness like the first one. However, in such a case, the second kind of matrices would fall into the same cell of the magazine intended for the first kind of matrices. In order to prevent this, such matrices are made of different thickness in those places where the perforations are located, the distribution depending solely upon these places, and, to this purpose, the material is made in such places correspondingly thinner than the remaining portion of the matrix. This is shown in the cross section of the matrix represented in Fig. 21.

I claim as my invention:

1. In a linotype machine the combination of a machine frame, a horizontal shaft mounted in bearings thereon, several composing frames rotatably supported on said shaft in a vertical plane and at equal distances from its center and from each other circumferentially, a type matrix selecting and setting apparatus operated by striking lettered keys, a magazine containing typematrices and spacers above said setting apparatus, a type bar casting apparatus on the opposite side of the shaft to the selecting apparatus, a matrix distributing apparatus above said magazine, said setting casting and distributing apparatus being so placed that when one of said composing frames is at the side of the setting apparatus and in communication therewith, one of the other composing frames is at the casting apparatus in the position required for casting a typebar, and another composing frame at the distributing apparatus; and means for intermittently rotating said composing frames partially around said shaft and arresting them in succession at the setting apparatus, for the purpose of successively setting a line of type matrices in one of said composing frames while a typebar is cast off the line set in one of the preceding matrices and the matrices contained in another preceding composing frame are pushed out therefrom and redistributed into the magazine.

2. In a linotype machine the combination of a magazine containing channels for receiving polygonal, nearly circular type matrices in the entire circumference of which character dies are distributed each of the latter representing a different letter and containing a round metal perforation and laterally therefrom, but one single hole for adjusting all the letters into the correct line for casting and each being also adapted to describe an entire revolution, mechanism operated by the striking of a key on a keyboard adapted to release one of said matrices at a time from said magazine, a collector adapted to receive the released matrix, means for rotating said matrix and for stopping it with the character corresponding with that on the key struck in the casting line, a composing frame adapted to receive a series of said matrices, selfacting means adapted to push the stopped matrix from the collector into the composing frame, means operated selfactingly for locking the composing frame after a line of matrices has been set, a type bar casting apparatus and means for carrying the composing frame and set matrices to the same and hold it while a type bar is cast from the matrices, a distributing apparatus above said magazine, means for carrying the composing frame after the typebar has been cast to said distributing apparatus, selfactingly unlocking the composing frame and pushing the matrices on to said distributing apparatus.

3. In a linotype machine the combination of a rotatable carrier wheel, four composing frames fixed to its circumference at equal distances from each other, said frames being in the same vertical plane, a continuously revolving shaft, means operated by hand and adapted to connect said wheel and shaft and means adapted to disengage the wheel selfactingly from the shaft after the wheel has made a quarter revolution and to hold it.

4. In a linotype machine the combination with a matrix magazine and setting apparatus of matrices of various thicknesses formed of flat polygonal almost circular disks (1) having type dies cut into the flat faces, a perforation (5) between each two flats and a slot from each perforation to the outside, a central hole (2) and a smaller eccentric hole (4).

5. In a linotype machine the combination with a magazine and setting apparatus of elastic spacers each consisting of a plate (6) having a central hole, an angular spring (7) riveted to the plate and having a projecting part bent back (11) adapted to slide in recess in the edge of the plate, a second spring blade (8) riveted to the plate, said springs being bent away from the plate.

6. In a linotype machine the combination of a magazine adapted to contain type matrices and elastic spacers, a collector below said magazine, a composing frame adjacent thereto, mechanism operated by the striking of keys on a keyboard adapted to release a matrix or a spacer from said magazine according to the key struck and to allow it to drop into the collector, a piston in said collector having a hollow bush, a mandrel adapted to slide in said bush, polygonal type matrices each having a central hole adapted to receive the end of said mandrel and an eccentric hole, friction pulleys mounted on spindles sliding in bushes, revoluble standards having bearings for said bushes, a series of sliding stop pegs guided in the back wall of the collector and adapted to enter the eccentric hole in the matrices and mechanism brought into action by the striking of a key adapted to turn said standards and press the friction pulleys against the type matrices and rotate them and to advance the stop peg corresponding with the key struck and cause it to enter the eccentric hole in the matrix and stop it with the character corresponding with that on the key struck in the casting line, then to withdraw the friction pulleys, advance the piston to push the matrix set into the composing frame and retire the piston and stop g.

7. In a linotype machine the combination of a magazine containing polygonal type matrices and elastic spacers both provided with central holes, mechanism brought into action by the striking of a key on a keyboard adapted to release one of said matrices at a time from said magazine, set it with the corresponding character into the casting line and push it into a composing frame and to release and set one of the spacers, an intermittently rotatable carrier wheel and composing frames attached thereto, a fixed spindle in each of said frames adapted to enter the central holes in the matrices and spacers, a piston in each frame adapted to be pushed back by the matrices and spacers inserted into the frame, a spring adapted to be wound up by the pushing back of the piston, means for compressing the line of matrices and spacers by the piston and locking the latter in its position, a closing piece movable on a pivot and a spring adapted to open the same on each composing frame, an abutment on the machine frame adapted to turn the closing piece into its closing position as the composing frame is moved away from the setting place by the rotation of the carrier wheel, a detent adapted to hold the closing piece in this position, a distributing rail above the magazine, an abutment on the machine frame adapted to withdraw the detent and liberate the closing piece and piston when by the intermittent rotation of the carrier wheel a composing frame arrives at the distributing rail.

8. In a linotype machine the combination of a matrix magazine containing several separate channels, type matrices consisting of polygonal disks having characters dies in their flat faces and holes between each pair of flats with slots from said holes to the outer circumference, the matrices for each set of characters having a different thickness from the others, an inclined distributing rail above said magazine having a central web and a beaded lower edge adapted to enter the slotted holes in the matrices, opposite notches in said beaded edge above each channel of the magazine corresponding in width with the thickness of the matrices to be delivered into each channel, mechanism adapted to select matrices from said channels, set them in line and inclose them in a composing frame, a rotatable wheel carrying said composing frame, means for intermittently rotating and stopping said wheel, means operating self-actingly adapted to open the composing frame when arrived at the distributing rail and to push the matrices with one of their slotted holes upon the distributing rail.

9. In a linotype machine the combination of a matrix setting apparatus, sets of type matrices each for a different kind of character or font, having perforations and slots from said perforations to their outer circumference, the slots in one set being of different width from the slots in the others and the different matrices in each set having different thicknesses, a magazine containing a channel for each kind of matrix and adapted to deliver matrices from each to the same setting apparatus and to receive them from the same distributing apparatus.

10. In a linotype machine the combination of a matrix setting apparatus, sets of type matrices each for a different kind of character or font, a matrix magazine having an upward part with a channel for each kind of matrix in each set, and lower parts having each channels for the different sorts of matrices forming one set and hinged to the upper and adapted to be moved into such a position that their lower ends are above and in communication with the matrix collector of the setting apparatus.

11. In a linotype machine the combination of sets, each for a different kind of character or font of almost circular type matrices, having perforations and slots from said perforations to their circumference, the slots in one set having a different width from that of the slots in the other, and the different matrices in each set having different thicknesses, a matrix magazine having a separate channel for each kind of matrix, an inclined distributing rail having a central web and a bead on each side at its lower edge adapted to enter into the slotted perforations of all the matrices and placed above said magazine, opposite notches in the beads of the guide rail above each channel of the magazine corresponding in width with the thickness of the matrices to be delivered into each channel but of different depths for the different sets of matrices for different characters.

In witness whereof I have hereunto set my hand in presence of two witnesses.

FRANZ SCHIMMEL.

Witnesses:
 ALOÍSE BÉHR,
 HANSON C. COXE.